United States Patent Office 3,637,547
Patented Jan. 25, 1972

3,637,547
PHENOL-ALDEHYDE RESIN ADHESIVE
COMPOSITION
George Otto Orth, Jr., Seattle, Wash., assignor to Georgia-Pacific Corporation, Portland, Oreg.
No Drawing. Original application Nov. 7, 1966, Ser. No. 592,322, now Patent No. 3,522,128. Divided and this application Jan. 28, 1970, Ser. No. 6,556
Int. Cl. C08g 51/06, 51/18
U.S. Cl. 260—17.2                                  4 Claims

ABSTRACT OF THE DISCLOSURE

A phenol-aldehyde resin adhesive containing from 5 to 50 weight percent of a colloidal attapulgus or sepiolite clay.

---

This application is a divisional application of application Ser. No. 592,322, filed Nov. 7, 1966 now Pat. No. 3,522,128.

This invention pertains to a process for manufacture of wood laminates and an adhesive used therein. More particularly, it pertains to the manufacture of wood laminates employing a pre-pressing step with a particular phenol-aldehyde condensation resin adhesive.

In the manufacture of plywood and other wood laminate products, phenol-aldehyde adhesives are commonly used. These adhesives have desired water resistant properties but generally require heat setting which involves compressing the assembled plys or panels at an elevated temperature to complete the condensation reaction of the adhesive. The capacity of the heated platen presses and the quality of the laminated wood products obtained can be materially improved by pre-pressing the assembled panels prior to heat setting the adhesive. However, for a successful pre-pressing operation, the adhesive requirements and characteristics are considerably more critical and demanding. In addition to the requirements that the adhesive be easily spreadable, have a long pot life, and have the required penetration to form a strong bond, the adhesive must form a sufficient bond upon pre-pressing to permit the handling of the pre-pressed panels or laminates without shifting or separation of the plys after the pressure is removed. After the pre-pressing, the laminate or consolidated panel may be stored for various lengths of time from a few minutes to hours before the heat setting step. Thus, the adhesive, in addition to providing the necessary initial bond, must remain after pre-pressing in a form capable of forming a strong final bond upon heat setting.

It is therefore an object of this invention to provide an improved process for the preparation of wood laminates.

Another object is to provide an improved process for the preparation of wood laminates employing a pre-pressing step prior to heat setting.

A still further object is to provide a phenol-aldehyde adhesive for use in the pre-pressing process, the adhesive being characterized by forming a sufficient initial or pre-press bond to permit handling of the laminates and still retain the necessary fluidity over long periods of time to form a strong final bond upon heat setting.

The above and other objects are attained by employing a phenol-aldehyde condensation resin adhesive to which has been added from 5 to 50 weight percent, based upon phenol-aldehyde resin solid, of a colloidal, acicular magnesium aluminum silicate clay such as attapulgite and sepiolite. The addition of the particular clay to the phenol-formaldehyde adhesive will impart properties to the adhesive which will result in obtaining a strong initial bond and also a strong final bond upon heat setting the adhesive shortly after pre-pressing or after the pre-pressed panels are permitted to stand for hours prior to the heat setting. Further, the stand time required to obtain the bond upon pre-pressing is considerably decreased by use of the colloidal clays.

The phenol-aldehyde adhesive treated with the particular clay can be used under the various conditions and methods normally employed in wood laminate or plywood manufacture. In the assembly of the laminate or panel, the adhesive is applied to the plys generally in spreads of from 50 to 80 pounds per thousand square feet of double glue line. After the assembly the panel is subjected, at ambient temperature, to a pressure sufficient to bring the plys into contact with each other to consolidate the plys. Generally a pressure in the range of 50 to 250 pounds per square inch is used. The plies are subjected to the pressure until a sufficient initial or pre-press bond is obtained to keep the plies from separating or coming apart upon the release of the pressure. A bond of the required strength is usually obtained in a contact time in the range of ½ to 10 minutes, although in a particular type of panel construction a satisfactory bond may be obtained in the time required to attain contact pressure or the pressure necessary to bring the plys into contact with each other. After consolidation, the pressure is released and the panels are stored to await the pressing at an elevated temperature which may be 10 to 20 minutes or up to four hours or more. By consolidation or pre-pressing of the panels, the panels can be handled much more easily and quickly employing a greater extent of automation. Also, the number of platens loaded in the hot press can be increased, since the panels are near to the final thickness. Less curling or fold back of the outer plies is also obtained, thus decreasing the number of rejects. In hot pressing, the panels may be subjected to the pressures and temperatures normally employed for heat setting of the particular phenol-aldehyde adhesive. Pressures of from 100 to 250 pounds per square inch at temperatures in the range of 200 to 400 degrees F. are often used. The panels are subjected to the pressing for a sufficient time to bring the panels up to the curing temperature of the adhesive which, for the normal type of panel construction, may usually require 1 to 10 minutes.

While phenol per se, or hydroxybenzene-formaldehyde condensation product is most often used as the phenol-aldehyde adhesive, other aldehydes and phenols generally used for adhesives may be employed. Illustrative examples of some of the aldehydes which may be used are the aliphatic aldehydes such as acetaldehyde, propionaldehyde, aromatic aldehydes, such as benzylaldehyde, furfural and such other aldehydes as aldol, glyoxal and crotonaldehyde. Illustrative examples, some of the phenols which may be employed in place of hydroxybenzene are resorcinol, cresol, pyrocatechol, cresylic acid, xylenols, naphthols, such as polyphenols such as the bis hydroxyphenyl alkanes as 2,2' - bis-(4-hydroxyphenyl) propane. The molar ratio of phenol to aldehyde used can be varied from 1:1 to 1:2.5, preferably in the range of 1:1.5 to 1.2.

Also in the formation of the adhesive, other constituents usually employed in phenol-aldehyde adhesives used for wood laminations may be added to impart the beneficial characteristics obtained by the particular constituents with the acicular clay being used as a filler or extender. For example, alkali and alkaline earth metal hydroxides are used to catalyze the condensation of the adhesive. Generally the amount of the hydroxide used is in a molar ratio of hydroxide to phenol in the range of from 0.3:1 to 1:1. In addition, accelerators such as alkali metal carbonates, alkali metal silicates, alkali metal borates and alkali metal phosphates may be employed, generally in amounts of from 1 to 20 weight percent of the resin solids. Also, other fillers and extenders, such as starch, wood flour, nutshell flour, bark products or agriculture residues and other additives commonly used in the plywood adhesive, such as boric acid, may be added in conjunction with the clay. Extenders such as starch are often used in amounts of from 1 to 10 weight percent of the resin solids.

The amount of the colloidal, acicular clay used in the adhesive is generally in the range of from 5 to 50 percent based upon the resin solids. When the clay is used without the addition of other fillers or extenders, the amount employed is generally in the upper part of the range. Preferably the clay is used in amounts in the range of from 10 to 25 percent with this amount replacing a portion of the other fillers and extenders normally used.

The attapulgite and sepiolite clays used are referred to herein as "colloidal" clays. These clays contain a sufficient amount of chemically bound water to disperse into particles of colloidal dimension once sheared in aqueous medium. They differ from the "activated" form wherein the clay is calcined after mining to remove the chemically bound water. Such activated or calcined clays may still retain their colloidal properties, if the clays have not been calcined to a point where the product contains less than 10 percent volatile matter.

The following examples further illustrate the invention.

EXAMPLE I

To illustrate the unique properties imparted to an adhesive by addition of a colloidal or acicular clay, an adhesive was prepared, using a phenol-formaldehyde condensation resin having a molar ratio of 1.8 moles of formaldehyde per mole of phenol to which attapulgus clay was added as a filler.

To 56 grams of the phenol-formaldehyde condensation product containing 40 percent resin solids and 2.5 grams of caustic soda, 10 grams of attapulgus clay, containing 22 percent volatile matter and sold under the trademark of Attagel 40, was added and the product intermixed with sufficient water to have an adhesive containing 25 percent resin solids. Six panels were prepared using three ⅛ inch x 10 inch plies. The plies were spread at a rate of 60 pounds of adhesive per thousand square feet of double glue line, left at open assembly for 15 minutes, and then pre-pressed for 2 minutes at 120 pounds per square inch. After the release of the pressure, the panels were permitted to stand for two hours and then pressed at 175 pounds per square inch at 300° F. for three minutes. The panels were tested after 24 hours and wood failures of from 90 to 100 percent were obtained in testing under dry conditions and 90 to 95 percent when tested under wet conditions.

The above test was repeated except that in place of attapulgus clay, a kaolin clay was used. Tests of the panels showed that only a 10 percent wood failure was obtained when tested under dry conditions and zero percent under wet.

The above run was repeated except that 15 grams of the kaolin clay were added to the adhesive instead of 10. Upon testing the panels, it was found that wood failure of 25 percent dry and 10 percent wet were obtained.

A further run was made in the manner described above except that bentonite clay was substituted for the attapulgus clay above. On testing, a 50 percent dry wood failure and a 35 percent wet wood failure were obtained.

EXAMPLE II

An adhesive was prepared containing constituents normally used in a phenol-formaldehyde plywood adhesive. The adhesive used was made by intermixing 56 grams of a phenol-formaldehyde condensation product containing 40 percent solids with 2.5 grams of sodium hydroxide, 2.5 grams of sodium carbonate, 5 grams of sodium silicate and 2.5 grams of starch and 10 grams of a furfural alcohol process residue obtained from oat hulls as fillers with the addition of various amounts of attapulgus clay.

Three ⅛ inch x 10 inch plies were assembled to form a ⅜ inch plywood panel. After the adhesive was spread, the plies were left open to the air for 5 minutes. The panel was then assembled and permitted to stand an additional 30 minutes, after which it was pre-pressed at 120 pounds per square inch for three minutes. After the pre-pressing, the panels were allowed to stand for 2 hours and then subjected to a hot pressing at 300° F. for 3 minutes at 175 pounds per square inch.

The amount of attapulgus clay, the spread weights and the results obtained upon testing of the panels after 24 hours are shown in the table below.

| Run | Clay added | | Spread, lbs. per MDGL | Percent dry wood failure | Percent wet wood failure |
| --- | --- | --- | --- | --- | --- |
| | Grams | Percent of resin solids | | | |
| | 0 | 0 | 65 | 75 | 40 |
| 1 | 1 | 5.4 | 65 | 75 | 40 |
| 2 | 2 | 9.0 | 65 | 60 | 60 |
| 3 | 3 | 13.4 | 64 | 90 | 90 |
| 4 | 4 | 18.0 | 60 | 95 | 95 |
| 5 | 5 | 22.4 | 60 | 95 | 95 |

What is claimed is:

1. A phenol-aldehyde resin adhesive which comprises a phenol-aldehyde condensation product having a molar ratio of phenol to aldehyde in the range of 1:1 to 1:2.5, an alkaline catalyst selected from the group consisting of alkali metal and alkaline earth metal hydroxides, and from 5 to 50 weight percent, based upon the phenol-aldehyde condensation product solids, of a clay selected from the group consisting of colloidal attapulgus and colloidal sepiolite clays.

2. An adhesive of claim 1 wherein the phenol-aldehyde condensation product is a hydroxybenzene-formaldehyde condensation product, the clay is colloidal attapulgus clay, and the catalyst is an alkali metal hydroxide present in a molar ratio of the hydroxide to hydroxybenzene in the range of 0.3:1 to 1:1.

3. An adhesive of claim 2 wherein the catalyst is sodium hydroxide, the attapulgus clay is present in an amount of from 10 to 25 weight percent, and the ratio of hydroxybenzene to formaldehyde is in a range of 1:1 to 1:2.5.

4. An adhesive of claim 3 wherein the adhesive contains from 1 to 10 percent of starch, from 1 to 20 percent of sodium silicate, and 1 to 10 percent of a filler selected from the grup consisting of wood flour, nutshell flour, bark powder and oat hulls residues obtained from furfural alcohol manufacture, said percents being based upon the weight of the hydroxybenzene-formaldehyde resin solids.

References Cited

UNITED STATES PATENTS

| 2,612,481 | 9/1952 | Cone | 260—17.2 S |
| 3,321,358 | 5/1967 | Campbell et al. | 161—261 |
| 3,522,128 | 7/1970 | Orth | 161—261 |

WILLIAM H. SHORT, Primary Examiner

E. WOODBERRY, Assistant Examiner

U.S. Cl. X.R.

260—38